US010341918B2

United States Patent
Cho et al.

(10) Patent No.: US 10,341,918 B2
(45) Date of Patent: Jul. 2, 2019

(54) METHOD AND APPARATUS FOR PERFORMING DATA TRANSMISSION IN A WIRELESS COMMUNICATION SYSTEM USING MULTIPLE RADIO ACCESS TECHNOLOGIES

(71) Applicant: LG ELECTRONICS INC., Seoul (KR)

(72) Inventors: Heejeong Cho, Seoul (KR); Ilmu Byun, Seoul (KR); Hyeyoung Choi, Seoul (KR); Genebeck Hahn, Seoul (KR); Eunjong Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/783,242

(22) PCT Filed: Apr. 10, 2014

(86) PCT No.: PCT/KR2014/003103
§ 371 (c)(1),
(2) Date: Oct. 8, 2015

(87) PCT Pub. No.: WO2014/168426
PCT Pub. Date: Oct. 16, 2014

(65) Prior Publication Data
US 2016/0066234 A1 Mar. 3, 2016

Related U.S. Application Data

(60) Provisional application No. 61/810,687, filed on Apr. 10, 2013, provisional application No. 61/820,698, (Continued)

(51) Int. Cl.
*H04W 4/00* (2018.01)
*H04W 36/14* (2009.01)
(Continued)

(52) U.S. Cl.
CPC ....... *H04W 36/14* (2013.01); *H04W 36/0083* (2013.01); *H04W 36/30* (2013.01); *H04W 48/18* (2013.01); *H04W 88/06* (2013.01)

(58) Field of Classification Search
CPC . H04W 36/14; H04W 36/0083; H04W 36/30; H04W 48/18; H04W 88/06
See application file for complete search history.

(56) References Cited

U.S. PATENT DOCUMENTS

2007/0079207 A1* 4/2007 Seidel ................ H04L 1/1845
714/748
2008/0039094 A1* 2/2008 Jeong ................ H04W 76/10
455/436
(Continued)

FOREIGN PATENT DOCUMENTS

JP 2009-177762 A 8/2009
JP 2010-045812 A 2/2010
(Continued)

OTHER PUBLICATIONS

3GPP TS 36331 V10.9.0—3rd Generation Partnership Project; Technical Specification Group Radio Access Network; Mar. 21, 2013, chapters 5.5.3, chapters 5.5.4.7 and 5.5.4.8 and chapter 5.5.6.1; report configInterRAT; p. 229.
(Continued)

*Primary Examiner* — Abdelnabi O Musa
(74) *Attorney, Agent, or Firm* — Dentons US LLP

(57) ABSTRACT

A method for and apparatus for performing data transmission in a wireless communication system is provided. A wireless device acquires information including a threshold on an action, which is configured for a secondary radio access technologies (RAT) system, checks a condition to be triggered by the threshold and a measurement result of the secondary RAT system, performs a corresponding action according to the condition. The secondary RAT system is
(Continued)

used for a User-Plane (U-plane) data, the threshold is changeable by at least one of a network preference including a primary RAT system or the secondary RAT system, a quality of service (QoS) information, and bearer information, the action includes whether an association/disassociation/data transition direction for the secondary RAT system is configured.

3 Claims, 14 Drawing Sheets

Related U.S. Application Data filed on May 8, 2013, provisional application No. 61/955,748, filed on Mar. 19, 2014.

(51) Int. Cl.
*H04W 48/18* (2009.01)
*H04W 36/00* (2009.01)
*H04W 36/30* (2009.01)
*H04W 88/06* (2009.01)

(56) References Cited

U.S. PATENT DOCUMENTS

| | | | |
|---|---|---|---|
| 2011/0075605 A1* | 3/2011 | De Pasquale | H04B 7/022 370/328 |
| 2011/0134882 A1* | 6/2011 | Aoyama | H04W 36/0066 370/331 |
| 2011/0242969 A1 | 10/2011 | Dayal et al. | |
| 2012/0252433 A1 | 10/2012 | Martin et al. | |
| 2013/0016696 A1* | 1/2013 | Adjakple | H04W 76/025 370/331 |
| 2013/0083783 A1 | 4/2013 | Gupta et al. | |
| 2013/0329694 A1* | 12/2013 | Vrzic | H04W 36/165 370/331 |
| 2014/0128057 A1* | 5/2014 | Siomina | H04J 3/0685 455/423 |

FOREIGN PATENT DOCUMENTS

| | | |
|---|---|---|
| JP | 2011-509615 A | 3/2011 |
| JP | 2012-004659 A | 1/2012 |
| KR | 10-2012-0041144 A | 4/2012 |
| KR | 10-2012-0067621 A | 6/2012 |
| WO | 2009087099 A1 | 7/2009 |

OTHER PUBLICATIONS

Alcatel-Lucent, Alcatel-lucent Shanghai Bell, "Network Selection for 3GPP-WLAN radio networking," 3GPP TSG-RAN WG2 #81bis, Apr. 15-19, 2013, R2-131317.
Change Request: CATT, CMCC, Alcatel-Lucent, Ericsson, Huawei, "Small correction on unnecessary IRAT HO," 3GPP TSG-RAN3 Meeting #73, Aug. 22-26, 2011, R3-112216.

* cited by examiner

FIG. 4

| Frame control | Persistent /ID | Address 1 | Address 2 | Address 3 | Sequence control | Address 4 | Sequence control | QoS control | HT control | Frame body | FCS |

(a)

(b)

(a)

(b)

(c)

METHOD AND APPARATUS FOR PERFORMING DATA TRANSMISSION IN A WIRELESS COMMUNICATION SYSTEM USING MULTIPLE RADIO ACCESS TECHNOLOGIES

This application is a 35 USC § 371 National Stage entry of International Application No. PCT/KR2014/003103 filed on Apr. 10, 2014, which claims priority to US Provisional Application No. 61/810,687, filed on Apr. 10, 2013, US Provisional Application No. 61/820,698, filed on May 8, 2013, and US Provisional Application No. 61/955,748, filed on Mar. 19, 2014, all of which are incorporated by reference in their entirety herein.

BACKGROUND OF THE INVENTION

Field of the Invention

The present invention relates to wireless communications, and more specifically, to a method and apparatus for performing data transmission in a wireless communication system.

Related Art

With the recent trend of increasing high-rate data traffic, fifth generation mobile communication technologies are in discussion for their realistic and efficient backup. One of requirements for fifth generation mobile communication technologies is the interworking between heterogeneous wireless communication systems, particularly between a cellular system and a wireless local area network (WLAN) system. The cellular system may be one of a 3rd generation partnership project (3GPP) long-term evolution (LTE) system, a 3GPP LTE-A (advanced) system, and an institute of electrical and electronics engineers (IEEE) 802.16 (WiMax, WiBro) system. The WLAN system may be an IEEE 802.11 (Wi-Fi) system. In particular, WLAN is a wireless communication system that is commonly used for various user equipments, and thus, the cellular-WLAN interoperation is a high-priority convergence technique. Offloading by the cellular-WLAN interoperation may increase the coverage and capacity of the cellular system.

The arrival of the ubiquitous environment led to a sharp increase in demands for seamless services anytime, anywhere. The fifth generation mobile communication system may adopt a plurality of radio access technologies (RATs) for always gaining easy access and maintaining efficient performance in any place. In other words, the fifth-generation mobile communication system may use multiple RATs in a converging manner through the interoperation between heterogeneous wireless communication systems. Each entity in the plurality of RATs constituting a fifth-generation mobile communication system may exchange information therebetween, and accordingly, the optimal communication system may be provided to a user in the fifth-generation mobile communication system. Among the plurality of RATs constituting the fifth-generation mobile communication system, a specific RAT may operate as a primary RAT system, and another specific RAT may operate as a secondary RAT system. That is, the primary RAT system may mainly play a role to provide a communication system to a user in the fifth-generation mobile communication system, while the secondary RAT system may assist the primary RAT system.

In general, a 3GPP LTE(-A) or IEEE 802.16 cellular system with relatively broad coverage may be a primary RAT system, and a Wi-Fi system with relatively narrower coverage may be a secondary RAT system.

In general, in an interworking system of the cellular system and the WLAN system, all data flows transmitted/received through a secondary RAT system (e.g., Wi-Fi system) as well as a primary RAT system (e.g., cellular system) may be controlled by a device operating as a local mobility anchor (LMA). When a session for the Wi-Fi system already exists, a need for performing fast data transition for the cellular system may be required for simultaneous transmission.

SUMMARY OF THE INVENTION

The present invention provides a method and apparatus for performing data transmission in a wireless communication system.

The present invention provides a method and apparatus for performing fast transition for data in a wireless communication system.

In an aspect, a method for performing data transmission in a wireless communication system is provided. The method may include acquiring information including a threshold on an action, which is configured for a secondary radio access technologies (RAT) system; checking a condition to be triggered by the threshold and a measurement result of the secondary RAT system; and performing a corresponding action according to the condition, Wherein the secondary RAT system is used for a User-Plane (U-plane) data, the threshold is changed by at least one of a network preference including a primary RAT system or the secondary RAT system, a quality of service (QoS) information, and bearer information.

In another aspect, a wireless device for performing data transmission in a wireless communication system is provided. The wireless device includes a radio frequency (RF) unit for transmitting and receiving a radio signal; and a processor operatively coupled to the RF unit, wherein the processor is configured for: acquiring information including a threshold on an action, which is configured for a secondary radio access technologies (RAT) system; checking a condition to be triggered by the threshold and a measurement result of the secondary RAT system; and performing a corresponding action according to the condition, Wherein the secondary RAT system is used for a User-Plane (U-plane) data, the threshold is changed by at least one of a network preference including a primary RAT system or the secondary RAT system, a quality of service (QoS) information, and bearer information.

The proposed embodiment supports data and control transmission efficiency with dynamic cellular data flow sessions. Especially, the proposed embodiment supports various parameters including UE-specific threshold(s), data-specific threshold(s), and a network preference information for faster transition and various parameters of actions each defined in interworking system having cellular and Wi-Fi environments.

BRIEF DESCRIPTION OF THE DRAWINGS

FIG. 4 shows an example of a frame structure of WLAN system which the present invention is applied.

DESCRIPTION OF EXEMPLARY EMBODIMENTS

A technology below can be used in a variety of wireless communication systems, such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented using radio technology, such as universal terrestrial radio access (UTRA) or CDMA 2000. TDMA can be implemented using radio technology, such as global system for mobile communications (GSM)/general packet radio service (GPRS)/enhanced data rates for GSM evolution (EDGE). OFDMA can be implemented using radio technology, such as IEEE 802.11 (Wi-Fi), IEEE 802.16(WiMAX), IEEE 802-20, or Evolved UTRA (E-UTRA). IEEE 802.16m is the evolution of IEEE 802.16e, and it provides a backward compatibility with an IEEE 802.16e-based system. UTRA is part of a universal mobile telecommunications system (UMTS). The 3rd generation partnership project (3GPP) long term evolution (LTE) is part of evolved UMTS (E-UMTS) using evolved-UMTS terrestrial radio access (E-UTRA), and it adopts OFDMA in downlink (DL) and SC-FDMA in uplink (UL). LTE-A (advanced) is the evolution of 3GPP LTE.

3GPP LTE(-A) and IEEE 802.11 are chiefly described as an example in order to clarify the description, but the technical spirit of the present invention is not limited to 3GPP LTE(-A) and IEEE 802.11.

Figure 1:
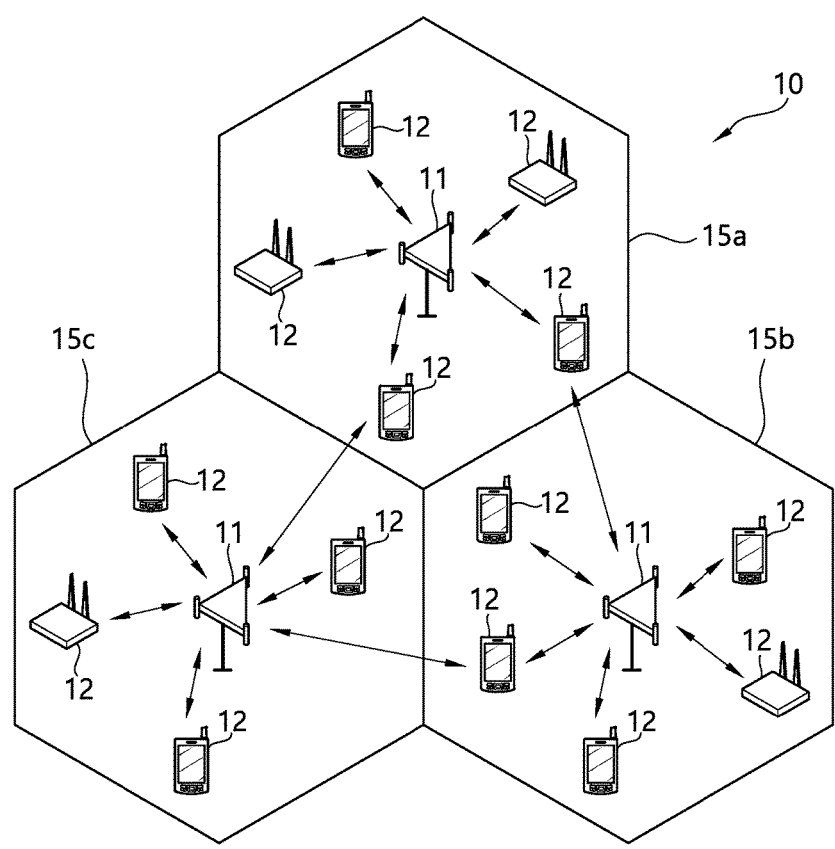
FIG. 1 shows a wireless communication system to which the present invention is applied.

FIG. 1 shows a wireless communication system to which the present invention is applied.

Referring to FIG. 1, the cellular system 10 includes one or more base stations (BSs) 11. The BSs 11 provide communication services to respective geographical areas (in general called 'cells') 15*a*, 15*b*, and 15*c*. Each of the cells can be divided into a number of areas (called 'Sectors'). A user equipment (UE) 12 can be fixed or mobile and may be referred to as another terminology, such as a mobile station (MS), a mobile terminal (MT), a user terminal (UT), a subscriber station (SS), a wireless device, a personal digital assistant (PDA), a wireless modem, or a handheld device. In general, the BS 11 refers to a fixed station that communicates with the UEs 12, and it may be referred to as another terminology, such as an evolved-NodeB (eNB), a base transceiver system (BTS), or an access point.

The UE generally belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

Figure 2:
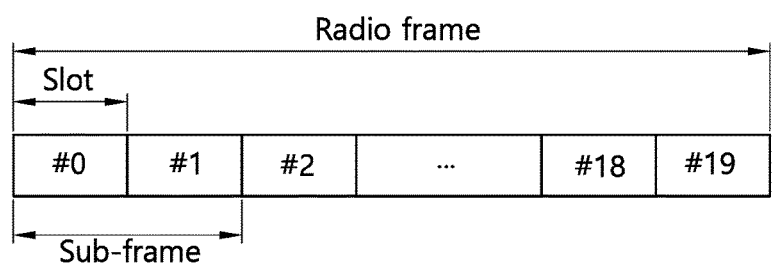
FIG. 2 shows an example of a radio frame structure to which the present invention is applied.

FIG. 2 shows an example of a radio frame structure to which the present invention is applied.

Referring to FIG. 2, the radio frame includes 10 subframes, and one subframe includes two slots. The slots in the radio frame are numbered by #0 to #19. A transmission time interval (TTI) is a scheduling unit for a data transmission. In 3GPP LTE, one TTI may be identical with a time taken for transmitting one subframe. A radio frame may have a length of 10 ms, a subframe may have a length of 1 ms, and a slot may have a length of 0.5 ms.

One slot includes a plurality of orthogonal frequency division multiplexing (OFDM) symbols in a time domain and a plurality of subcarriers in a frequency domain. Since 3GPP LTE uses OFDMA in downlink, the OFDM symbols are used to express a symbol period. The OFDM symbols may be called by other names depending on a multiple-access scheme. For example, when a single carrier frequency division multiple access (SC-FDMA) is in use as an uplink multi-access scheme, the OFDM symbols may be called SC-FDMA symbols. A resource block (RB), a resource allocation unit, includes a plurality of continuous subcarriers in a slot. The structure of the radio frame is merely an example. Namely, the number of subframes included in a radio frame, the number of slots included in a subframe, or the number of OFDM symbols included in a slot may vary. 3GPP LTE defines that one slot includes seven OFDM symbols in a normal cyclic prefix (CP) and one slot includes six OFDM symbols in an extended CP.

Figure 3:
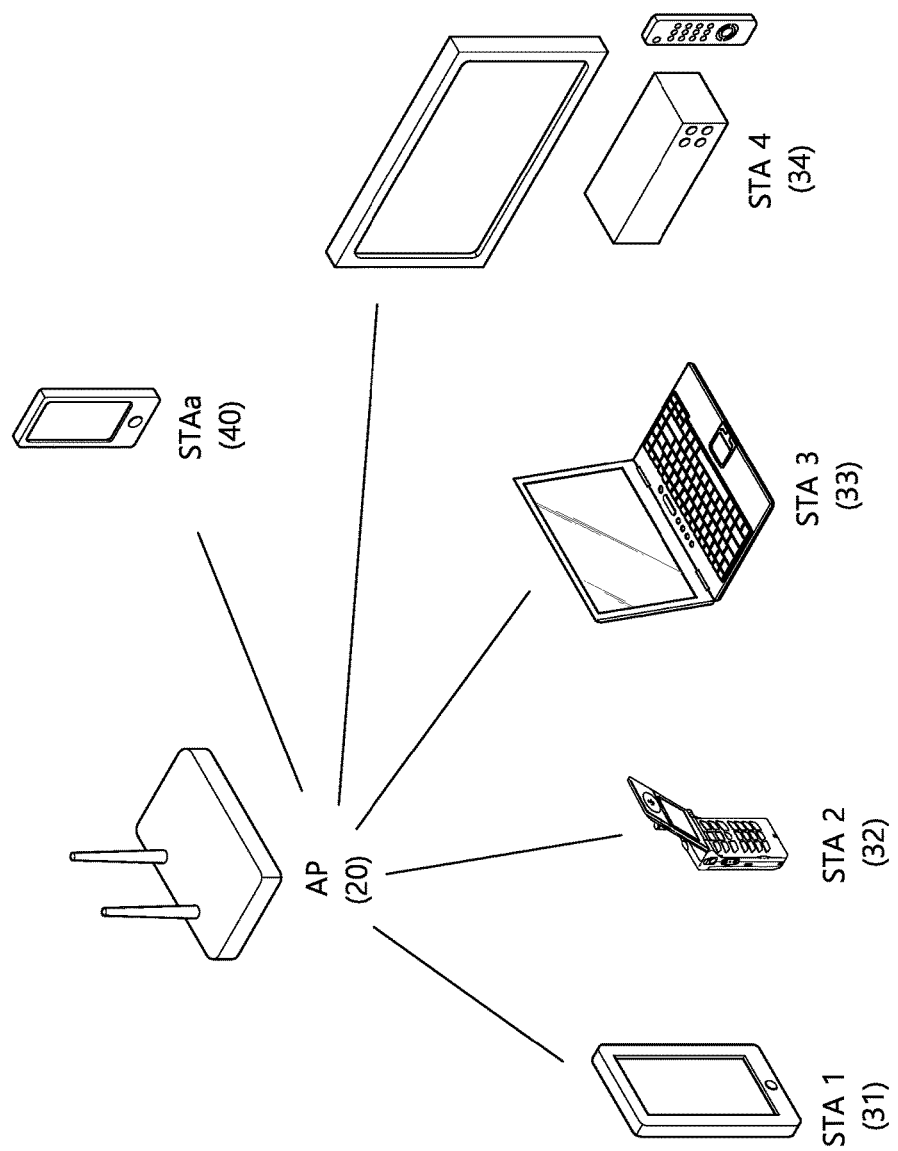
FIG. 3 shows a wireless local area network (WLAN) system which the present invention is applied.

FIG. 3 shows a wireless local area network (WLAN) system which the present invention is applied. The WLAN system may also be referred to as a Wi-Fi system.

Referring to FIG. 3, the WLAN system includes one access point (AP) 20 and a plurality of stations (STAs) 31, 32, 33, 34, and 40. The AP 20 may be linked to each STA 31, 32, 33, 34, and 40 and may communicate therewith. The WLAN system includes one or more basic service sets (BSSs). The BSS is a set of STAs that may be successfully synchronized with each other and may communicate with each other, and does not mean a specific region.

An infrastructure BSS includes one or more non-AP stations, APs that provide a distribution service (DS), and a DS that links a plurality of APs with each other. In the infrastructure BSS, an AP manages non-AP STAs of the BSS. Accordingly, the WLAN system shown in FIG. 3 may include an infrastructure BSS. In contrast, an independent BSS (IBSS) is a BSS that operates in ad-hoc mode. The IBSS does not include an AP and thus lacks a centralized management entity. That is, in the IBSS, the non-AP STAs are managed in a distributed manner. The IBSS may have all the STAs constituted of mobile STAs and is not allowed to access the distribution system, thus achieving a self-contained network. The STA is random functional medium that includes a physical layer interface for a wireless medium and an media access control (MAC)) observing IEEE 802.11 standards, and in its broader concepts, it includes both the AP and non-AP station.

The non-AP STA is an STA, not an AP. The non-AP STA may also be referred to as a mobile terminal, a wireless device, a wireless transmit/receive unit (WTRU), a user equipment (UE), a mobile station (MS), a mobile subscriber unit or simply as a user. Hereinafter, for ease of description, the non-AP STA denotes an STA.

The AP is a functional entity that provides access to a distribution system via a wireless medium for an STA associated with the AP. In the infrastructure BSS including an AP, communication between STAs is basically done via an AP, but in case a direct link is established, direct communication may be achieved between STAs. The AP may also be referred to as a central controller, a base station (BS), a NodeB, a base transceiver system (BTS), or a site controller.

A plurality of infrastructure BSSs may be linked with each another through a distribution system. The plurality of BSSs linked with each another is referred to as an extended service set (ESS). The APs and/or STAs included in the ESS may communicate with each other, and in the same ESS, an STA may move from one BSS to another, while in seamless communication.

FIG. 4 shows an example of a frame structure of WLAN system which the present invention is applied. A frame of WLAN system includes a set of fields in a fixed order.

Referring to FIG. 4, the frame includes a frame control field, a duration/ID field, an address 1 field, an address 2 field, an address 3 field, a sequence control field, an address 4 field, a quality of service (QoS) control field, an HT control field, a frame body field, and a frame check sequence (FCS) field. Among the fields listed above, the frame control field, the duration/ID field, the address 1 field, and the FCS field constitute a minimum frame format, and may be included in all IEEE 802.11 frames. The address 2 field, the address 3 field, the sequence control field, the address 4 field, the QoS control field, the HT control field, and the frame body field may be included only in a specific frame type.

The frame control field may include various subfields. The duration/ID field may be 16 bits in length. The address field may include a basic service set identifier (BSSID), a source address (SA), a destination address (DA), a transmitting STA address (TA), and a receiving STA address (RA). In the address field, different fields may be used for other purposes according to a frame type. The sequence control field can be used when fragments are reassembled or when an overlapping frame is discarded. The sequence control field may be 16 bits, and may include two subfields indicating a sequence number and a fragment number. The FCS field can be used to check an error of a frame received by a station. The FCS field may be a 32-bit field including a 32-bit cyclic redundancy check (CRC). An FCS can be calculated across the frame body field and all fields of a media access control (MAC) header.

The frame body field may include information specified for an individual frame type and subtype. That is, the frame body field carries high-level data from one station to another station. The frame body field can also be called a data field. The frame body field can be variously changed in length. A minimum length of the frame body field may be zero octet. A maximum length of the frame body field may be determined by a total sum of a maximum length of a MAC service data unit (MSDU), a length of a mesh control field, and an overhead for encryption or a total sum of a maximum length of an aggregated MSDU (A-MSDU) and an overhead for encryption. The data frame includes high-level protocol data of the frame body field. The data frame may always include the frame control field, the duration/ID field, the address 1 field, the address 2 field, the address 3 field, the sequence control field, the frame body field, and the FCS field. A presence of an address 4 field may be determined by a configuration of a 'To DS' subfield and a 'From DS' subfield in the frame control field. Another data frame type can be categorized according to a function.

A management frame may always include the frame control field, the duration/ID field, the address 1 field, the address 2 field, the address 3 field, the sequence control field, the frame body field, and the FCS field. Data included in the frame body field generally uses a fixed-length field called a fixed field and a variable-length field called an information element. The information element is a variable-length data unit.

The management frame can be used for various purposes according to a subtype. That is, a frame body field of a different subtype includes different information. A beacon frame reports an existence of a network, and takes an important role of network maintenance. The beacon frame corresponds to a parameter which allows a mobile station to participate in the network. In addition, the beacon frame is periodically transmitted so that the mobile station can scan and recognize the network. A probe request frame is used to scan an network in which the mobile station exists. A probe response frame is a response for the probe request frame. An authentication request is used so that the mobile station requests an access point to perform authentication. An authentication response frame is a response for the authentication request frame. A de-authentication frame is used to finish an authentication relation. An association request frame is transmitted so that the mobile station participates in the network when the mobile station recognizes the compatible network and is authenticated. An association response frame is a response for the association request frame. A de-association frame is used to finish an association relation. Three states may exist according to an authentication and association procedure as shown Table 1.

TABLE 1

|  | Authentication | Association |
| --- | --- | --- |
| State 1 | X | X |
| State 2 | O | X |
| State 3 | O | O |

To transmit a data frame, a device must perform the authentication and association procedure with respect to a network. In Table 1, a procedure of transitioning from the state 1 to the state 2 can be called the authentication procedure. The authentication procedure can be performed in such a manner that one device acquires information on a different device and authenticates the different device. The information on the different device can be acquired by using two methods, i.e., a passive scanning method for acquiring information on a different node by receiving a beacon frame and an active scanning method for acquiring the information on the different device by transmitting a probe request message and receiving a probe response message received in response thereto. The authentication procedure can be complete by exchanging an authentication request frame and an authentication response frame.

In Table 1, a procedure of transitioning from the state 2 to the state 3 can be called the association procedure. The association procedure can be complete when two devices exchange the association request frame and the association response frame upon completion of the authentication procedure. An association ID can be allocated by the association procedure.

Figure 5:
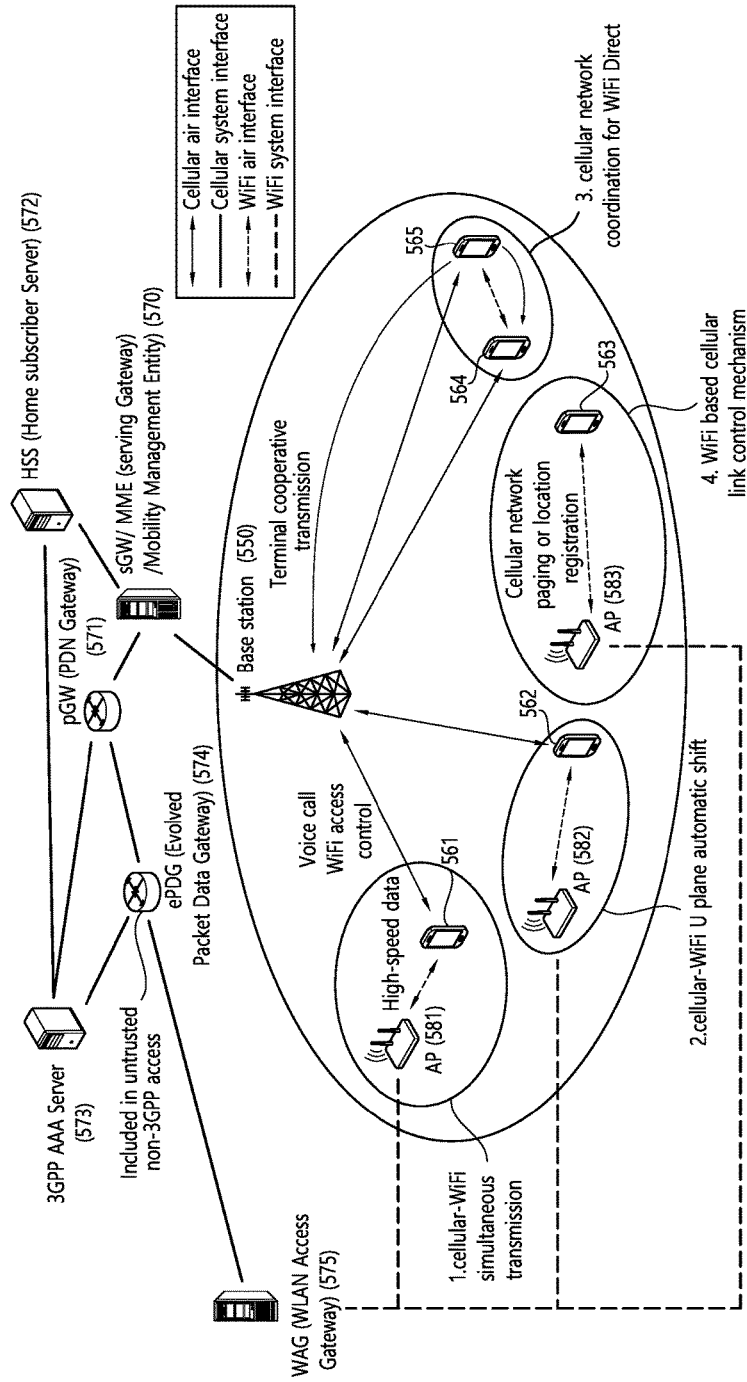
FIG. 5 shows an example of a scenario of a converged communication system of a cellular system and a Wi-Fi system.

FIG. 5 shows an example of a scenario of a converged communication system of a cellular system and a Wi-Fi system.

It is assumed in FIG. 5 that the cellular system operates as a primary RAT system of the converged communication system, and the Wi-Fi system operates as a secondary RAT system of the converged communication system. Further, the cellular system may be a 3GPP LTE(-A) system. Hereinafter, for ease of description, it is assumed that the primary RAT system of the converged communication system is a 3GPP LTE(-A) system, and the secondary RAT system of the communication system is an IEEE 802.11 system, i.e., a Wi-Fi system. However, embodiments of the present invention are not limited thereto.

Referring to FIG. 5, there are a plurality of general devices 561, 562, 563, 564, and 565 in the coverage of the cellular base station 50. Each of the general devices 561, 562,563, 564, and 565 may be a user equipment in a cellular system. The cellular base station 550 may communicate with each of the general devices 561, 562, 563, 564, and 565 via a cellular radio interface. For example, the cellular base station 550 may perform voice call communication with each of the general devices 561, 562, 563, 564, and 565 or may control access of each general device 561, 562, 563, 564, and 565 to a Wi-Fi system.

The cellular base station 550 is connected to a serving gateway (S-GW)/mobility management entity (MME) 570 through a cellular system interface. The MME contains a user equipment's access information or information on a user equipment's capability, and such information may be mainly used for mobility management. The MME is in charge of a control plane. The S-GW is a gateway having an E-UTRAN as an end point. The S-GW is in charge of a user plane. The S-GW/MME 570 is connected to a packet data network (PDN) gateway (P-GW) 571 and a home subscriber server (HSS) 572 through the cellular system interface. The PDN-GW is a gateway having a PDN as an end point.

The P-GW 571 and the HSS 572 are connected to a 3GPP access authentication authorization (AAA) server 573 through the cellular system interface. The P-GW 571 and the 3GPP AAA server 573 may be connected to an evolved packet data gateway (ePDG) 574 through the cellular system interface. The ePDG 574 may be included only in un-trusted non-3GPP access. The ePDG 574 may be connected to a WLAN access gateway (WAG) 575. The WAG 575 may be in charge of a P-GW in a Wi-Fi system.

Meanwhile, a plurality of APs 581, 582, and 583 may be present in the coverage of the cellular base station 550. Each of the APs 581, 582, and 583 may have coverage which is shorter than that of the cellular base station 550. Each of the APs 581, 582, and 583 may communicate with general devices 561, 562, and 563 that are present in its coverage through a Wi-Fi radio interface. In other words, the general devices 561, 562, and 563 may communicate with the cellular base station 550 and/or APs 581, 582, and 583. Communication methods of the general devices 561, 562, and 563 are as follows:

1) Cellular/Wi-Fi simultaneous radio transmission: the general device 561 may perform high-speed data communication with the AP 581 through a Wi-Fi radio interface while communicating with the cellular base station 550 through a cellular radio interface.

2) Cellular/Wi-Fi user plane automatic shift: the general device 562 may communicate with one of the cellular base station 550 and the AP 582 by user plane automatic shift. At this time, the control plane may be present in both the cellular system and the Wi-Fi system or only in the cellular system.

3) Terminal cooperative transmission: the general device 564 operating as a source device may directly communicate with the cellular base station 550 through a cellular radio interface or may indirectly communicate with the cellular base station 550 through a general device 565 operating as a cooperative device. That is, the cooperative device 565 may assist the source device 564 so that the source device 64 may indirectly communicate with the cellular base station 550 through itself. The source device 64 and the cooperative device 565 communicate with each other through a Wi-Fi radio interface.

4) Wi-Fi-based cellular link control mechanism: the AP 583 may perform a cellular link control mechanism such as paging or location registration of a network for the cellular general device 563. The general device 563 is not directly connected to the cellular base station 550 and may directly communicate with the cellular base station 550 thorough the AP 83.

Each of the APs 581, 582, and 583 is connected to the WAG 575 through a Wi-Fi system interface.

In general, in an interworking system of the cellular system and the WLAN system, all data flows may be transmitted and/or received simultaneously through a plurality of RAT systems (e.g., primary RAT system, secondary RAT system). In addition, all data flows transmitted/received through a secondary RAT system (e.g., Wi-Fi system) as well as a primary RAT system (e.g., cellular system) may be controlled by a device operating as a local mobility anchor (LMA). For example, data to be transmitted through a cellular system and data to be transmitted through a Wi-Fi system always go through the P-GW. That is, In FIG. 5, a device serving as an LMA may be the P-GW. In this regard, a term 'LMA' used in a proxy mobile Internet protocol (PMIP) protocol may be called a different term in another protocol, such as home agent (HA).

When data flows are transmitted through the plurality of RAT systems simultaneously in the converged communication system of the cellular system and the Wi-Fi system, scenarios for simultaneous transmission may be classified into a User-Plane(U-plane) separation for the same data flow (or, bandwidth/U-plane aggregation) and U-plane separation for different data flows (or, bandwidth/U-plane segregation).

Figure 6:
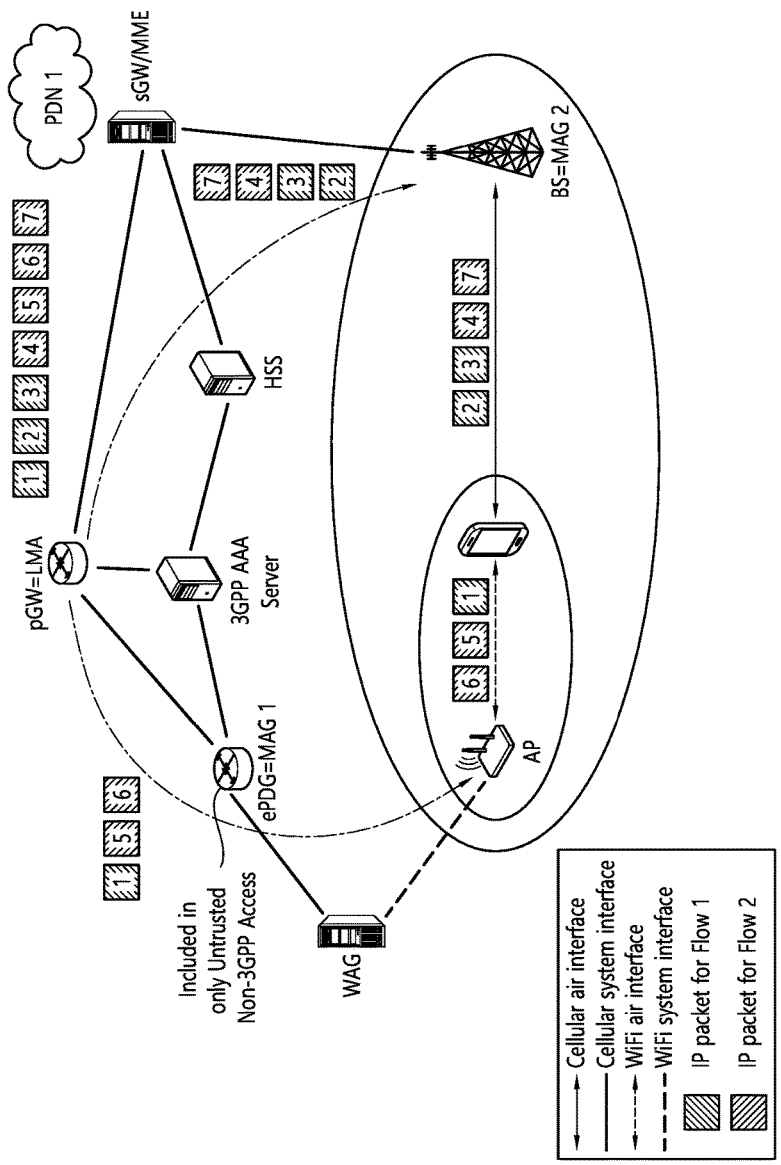
FIG. 6 shows an example of IP flow mobility in a converged communication system of a cellular system and a Wi-Fi system.

FIG. 6 shows an example of IP flow mobility in a converged communication system of a cellular system and a Wi-Fi system. FIG. 6 shows U-plane separation for the same data flow, i.e., bandwidth/U-plane aggregation.

Referring to FIG. 6, IP packets for flow 1 include IP packets 1, 2, and 3, and IP packets for flow 2 include IP packets 4, 5, 6, and 7. The P-GW is connected to a PDN 1, and operates as an LMA. That is, all IP packets are transmitted to a UE through the P-GW. The IP packet 1 in the IP packet for flow 1 is transmitted to the UE through the Wi-Fi system by going through an ePDG and/or a WAG, and IP packets 2 and 3 are transmitted to the UE through the cellular system by going through a BS. In this case, the ePDG or the WAG may be a mobile access gateway (MAG) in the Wi-Fi system, and the BS may be a MAG in the cellular system. In the IP packet for flow 2, the IP packets 5 and 6 are transmitted to the UE through the Wi-Fi system by going through the PDG and/or the WAG, and IP packets 4 and 7 are transmitted to the UE through the cellular system by going through the BS. That is, IP packets for different flows are aggregated each other.

Figure 7:
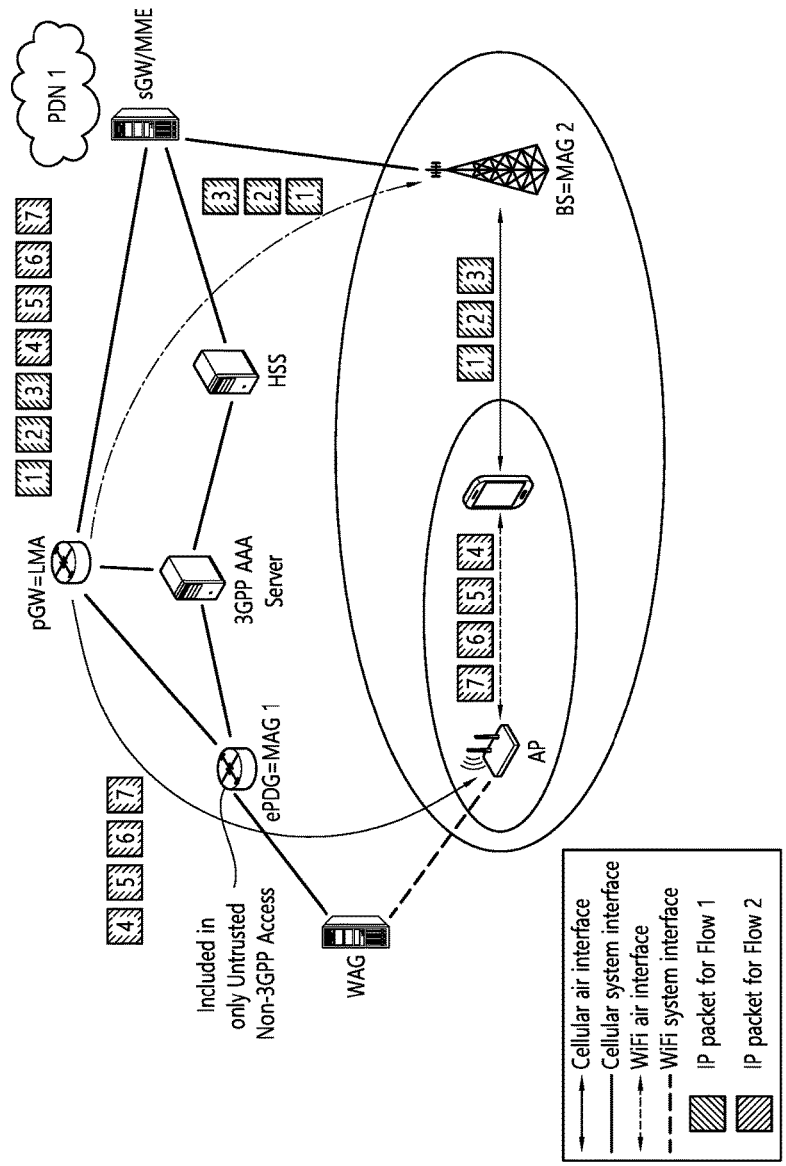
FIG. 7 shows another example of IP flow mobility in a converged communication system of a cellular system and a Wi-Fi system.

FIG. 7 shows another example of IP flow mobility in a converged communication system of a cellular system and a Wi-Fi system. The FIG. 7 shows U-plane separation for different data flows, i.e., bandwidth/U-plane segregation.

Referring to FIG. 7, IP packets for flow 1 include IP packets 1, 2, and 3, and IP packets for flow 2 include IP packets 4, 5, 6, and 7. The P-GW is connected to a PDN 1, and operates as an LMA. That is, all IP packets are transmitted to a UE through the P-GW. The IP packets for flow 1 are transmitted to the UE through the cellular system by going through a BS. In this case, the BS may be an MAG in the cellular system. The IP packets for flow 2 are transmitted to the UE through the Wi-Fi system by going through the ePDG and/or the WAG. In this case, the ePDG or the WAG may be an MAG in the Wi-Fi system. That is, IP packets for different flows are segregated each other.

In scenarios for simultaneous transmission, a method for establishing, by a network, a session to support seamless connectivity for data flows may be required. Accordingly, according to an embodiment of the present invention, a method for establishing, under the control of a primary RAT system, a data flow session for the same PDN in the primary RAT system is described. In a following description, it is assumed that the primary RAT system is a 3GPP LTE system and the secondary RAT system is a Wi-Fi system, but the present invention is not limited thereto. In a following description, it is assumed that a mobility IP network protocol is a PMIP, but the present invention is not limited thereto. The present invention may be applied to other protocols, such as a dual stack mobile IP (DSMIP) protocol, GPRS tunneling protocol (GP), etc. In addition, in the secondary RAT system, it is assumed that a data flow session for the same PDN already exists.

Further, the this present embodiment may provide a support that allows all data flows to be transmitted and received through the most appropriate RAT among multiple RAT systems, and such transmission may be defined as U-plane switch. In order to minimize transmission/reception interrupt time of the data flow, fast pre-(re)association and U-plane generation/switch are required. The circumstance where the fast pre-(re)association and U-plane generation/ switch are required may include when inter-AP seamless handover is demanded in the course of transmitting data flows using multiple RAT systems or when data flows are transmitted/received using multiple RAT systems.

For the purposes of such fast pre-(re)association and U-plane generation/switch, the present invention supports performing inter-AP seamless handover and primary RAT system control-based WiFi pre-(re)association trigger and procedure for applying bandwidth/U-plane segregation, U-plane switch, and bandwidth/U-plane aggregation as a cellular-WiFi convergence scenario.

In order to support efficiency and quickness for supporting data transmission, according to the present invention, a scheme of providing that a UE acquires information for fast scanning and a scheme of configuring adaptive thresholds according to a UE's action are hereinafter described in greater detail.

Figure 8:
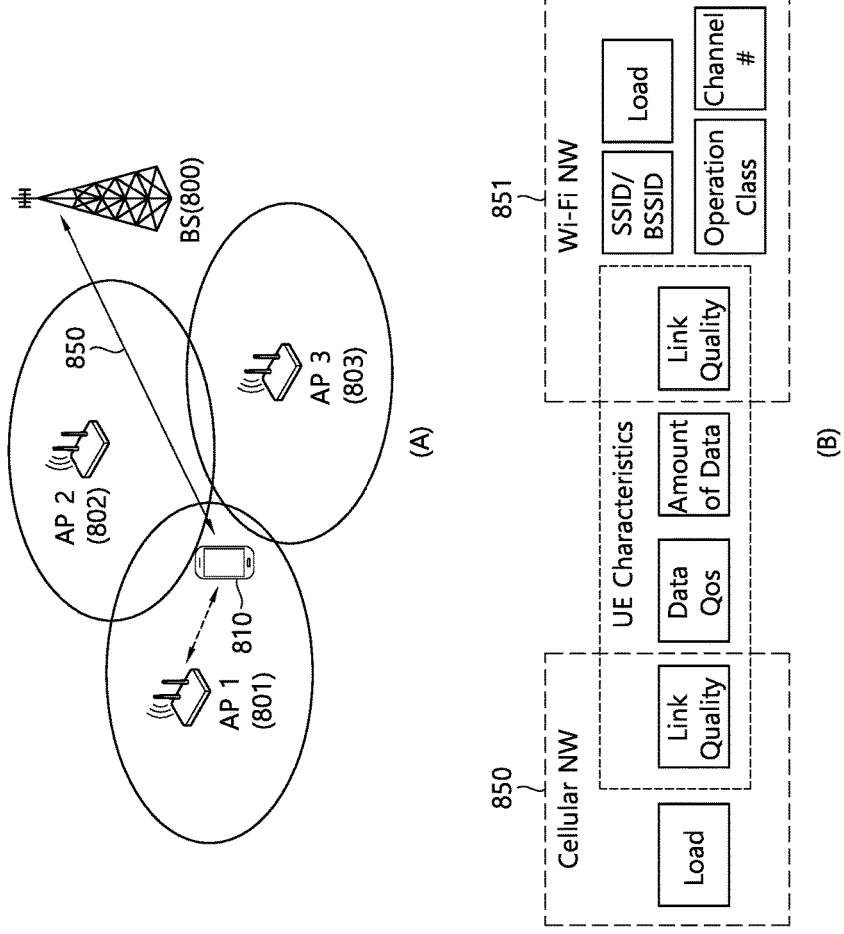
FIG. 8 shows examples of a pre-(re)association system which the present invention is applied.

FIG. 8 shows examples of pre-(re)association system which the present invention is applied.

Referring to FIG. 8(a), in a pre-(re)association for U-plane fast transition, a cellular network (e.g., base station, advanced-BS, eNB, HeNB, NB) 800 provides information for fast scanning to a UE 810. The information for the fast scanning includes a AP list (e.g., AP1, AP2, AP3) 801, 802, and 803 which is set by the UE's location, each AP's system information, beacon, frequency channel, system type and system version. Information of the system version may include information related to each AP's version such as IEEE 802.11a, IEEE 802.11b, IEEE 802.11g, IEEE 802.11n, or each AP's supportable center frequency, bandwidth, data speed, number of antennas (streams) and information on a modulation scheme or other system information that is newly defined in future enhanced consolidated systems. Further, when inter-AP handover is performed with seamless, the fast scanning information including a list of AP(s) having the same SSID/HESSID as the serving AP (AP1) may be configured.

The UE 810 performs U-plane fast transition to an AP when the UE obtained the information for the fast scanning to satisfy predetermined conditions. Hereinafter, a UE-specific threshold for the fast transition is defined. According to the present invention, the cellular network may define the threshold(s) per-action according to measurement results for WiFi. At this time, the cellular network may negotiate with the UE with respect to the per-action threshold. Definitions may be made as shown in Table 2 below.

TABLE 2

| Action # | contents |
| --- | --- |
| Action # 2 | pre-(re)association |
| Action # 3 | U-plane transition from Cellular network to WiFi network |
| Action # 4 | scanning suspend |
| Action # 5 | disassociation |
| Action # 6 | U-plane transition from WiFi network to Cellular network |

Additionally, the threshold(s) per-action according to the measurement result for WiFi by the UE may be defined, and this threshold(s) may be negotiated with the cellular network.

The threshold(s) per-action may contain a quality parameter at service level, such as, e.g., QCI (QoS Class Identifier), an upper preference and/or NW preference (e.g., cellular/WLAN preferred), load circumstance (balance) for cellular link, link quality (e.g., cellular/WLAN) and measurement result, bearer quality characteristics of a corresponding UE or may be configured differently depending on quality parameters including Data QoS for an aggregated maximum bit rate (data speed) such as APN-AMBR(access point name-aggregate maximum bit rate), UE-AMBR(UE-aggregate maximum bit rate), and amount of Data.

Here, each threshold has a different condition number each. Further, the threshold(s) for Actions #2, 4, and 5 may not need to be defined per bearer owned by the UE. As an example, Threshold value for Action #2=MIN (value for Bearer ID1, value for Bearer IDb 2, . . . , value for Bearer ID n).

Further, FIG. 8(b) shows a best NW selection with the fast scanning. For example, when some users or users' specific data are intended to be delivered through Wi-Fi due to increased load of a cellular NW (an eNB) (850), the cellular NW may transfers information including SSID, BSSID, operating class, channel # of a Wi-Fi AP (or APs, candidates APs)(851) which is(are) available to handle load off among APs (neighbor APs) related to a UE.

When the UE starts to scan only specific operating class and channel # according to the information (the transferred information) received from the cellular NW, thus the UE can lead to fast transition and perform energy savings of the data transmission. It includes that the network selection between WLAN as secondary system and 3GPP network as primary system is based on the UE, which can make network selection decisions subject to Access Network Discovery and Selection Function (ANDSF) policy. The UEs each largely can rely on local signal strength and network preference to make network selection decisions. Also the UE can determine that the network selection based on signal strength and WLAN-preferred information. Further this includes the network selection based on network-wide real-time parameters by the UE and network which the present invention is applied.

In other words, based on a scanning result (Wi-Fi link quality) and cellular link quality obtained through the existing measurement report, QoS of each data (bearer), and the amount of data transmitted and received, the cellular NW or the UE can determine whether one of the cellular and/or Wi-Fi networks is to be used on a per-UE or, data basis. This invention further includes performing per-UE, per-data for the best NW selection.

Figure 9:
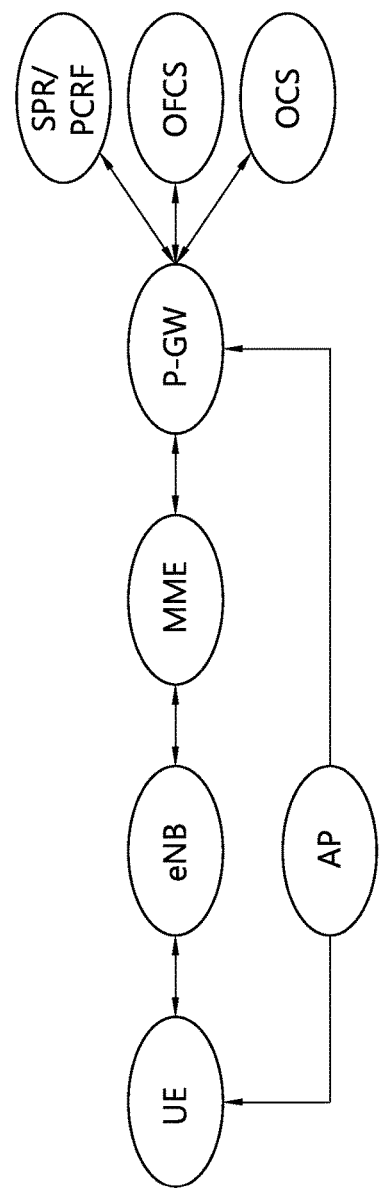
FIG. 9 shows an example of policy of service provider cost reduction using user subscription information.

Meanwhile, FIG. 9 shows that a service provider's policy is described in detail in connection with NW preference. This is to describe an example policy of a service provider reducing expense using user subscription information.

A user may use a voice service which may be billed on an hourly rate basis or unlimited depending on price plan (model)s, and the short message service (SMS)/multimedia message service (MMS) may be billed unlimited or per message depending on the price plans. If a user who has subscribed to unlimited option (the plan, the model) attempts to voice or message service, the service provide benefits in light of expense when providing the service through Wi-Fi systems. Further, the service provider may establish a Wi-Fi system-based new plan for users who enrolled in a per-hour/per-call (or message) basis plan. For example, in case used hours/calls (or messages) exceed the hours/calls (or messages) predetermined by the plan, the service provider may provide the service through the Wi-Fi system.

As shown in the FIG. 9, the service provider may manage user subscription information using, e.g., subscriber profile repository (SPR), offline charging system (OFCS), online charging system (OCS). The SPR may manage information such as allowed services or allowed QoS. The OFCS may manage information such as accounting data (traffic amount, access time, etc) for each UE. The OCS may manage the remaining usage for each UE. Information for operation required by the communication service provider according to the user subscription information may be delivered to each entity.

In other words, the communication service provider may transfer the type of network that is favored by the service provider for each service (e.g., LTE system, Wi-Fi system) to each entity such as UE, eNB or MME. The information for the operation required by the service provider according to the user subscription information may be delivered during a PDN connection (bearer) establishment/modification process or U-plane separation request/response process or a process for faster transition including a UE-specific threshold according to the this present embodiment. The delivered information may be used as reference or a criterion to determine whether U-plane separation is appropriate or for applying U-plane switch.

Hereinafter, the UE-specific threshold for faster transition according to the present invention is described. As the UE-specific threshold(s) may be defined as a bearer-basis UE-specific threshold.

TABLE 3

| Action # | Threshold value | Bearer ID | Condition# (Event #) |
|---|---|---|---|
| 2 | −30 dBm | — | 1 |
| 3 | −20 dBm | 11 | 2 |
| 3 | −10 dBm | 15 | 3 |

Or, QoS-basis UE-specific threshold may be defined and this is the same as that shown in Table 4. By way of example, in case Condition #2 is met (satisfied), a definition may be made in such a way that Action #3 (U-plane transition from Cellular network to WiFi network) applies to all bearers that correspond to the QCI.

TABLE 4

| Action # | Threshold value | QCI | Condition# (Event #) |
|---|---|---|---|
| 2 | −30 dBm | — | 1 |
| 3 | −20 dBm | 1 | 2 |
| 3 | −10 dBm | 12 | 3 |

Further, the UE-specific threshold transferred as parameters for faster transition may include Configuration type, Condition #, Action #, Threshold value, Bearer information (e.g., all, LCID/DRB ID/E-RAB ID/EPS Bearer ID), QoS information (e.g., QCI), NW preference, etc. Here, Configuration type includes a status such as setup/modify/release for the condition. 'Setup' refers to when a new condition configuration is added, 'Modify' when an already setup condition configuration is varied (modified), and 'Release' when an already setup condition configuration is removed (released), the Release may also be used for stopping scanning for faster transition. Also the threshold can be defined based on data amount, data characteristic (type), or data QoS.

The UE-specific parameters may further include Scanning information (e.g., Operating class/band, channel number, BSSID, SSID, HESSID, pre-association priority). The Scanning information is information that may be included when intending to (indicate) scanning of a WiFi entity (e.g., AP) included in the corresponding information while simultaneously delivering the UE-specific threshold, that is, the Scanning information includes an usage of an indication to indicate scanning operation of a corresponding AP by transmitting the UE-specific thresholds to the AP. Here, the Scanning information includes a limitation of APs (e.g., available AP, preferred AP, or private AP) having specific characteristics in order to minimize power consumption of the UE. Further pre-association priority for each AP may vary depending on the AP's load status and service set, that is, the pre-association priority is changeable based on load of each AP and service condition.

Further, the UE-specific parameters may include information on 'Satisfaction duration' that is a minimum period during which the condition of the corresponding Condition # should be met (satisfied). Further, the UE-specific parameter includes 'Sleep mode transition duration' that is a wait period for switch to WiFi sleep mode, where Sleep mode transition duration being set as 0 includes to take immediate switch action to sleep mode. The UE-specific parameter includes 'Disassociation duration' that is a WiFi disassociation wait period, when set as 0, includes to take immediate action of performing disassociation promptly.

Figure 10:
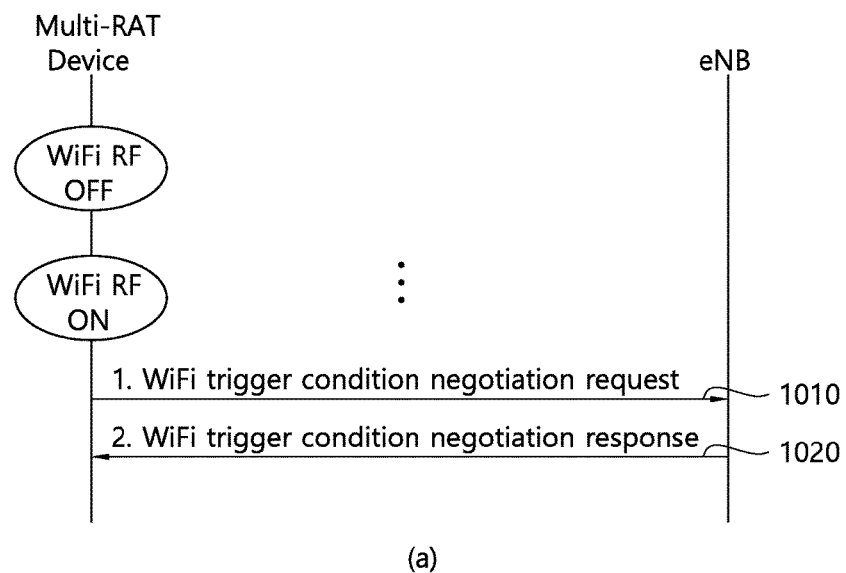
FIG. 10 and FIG. 11 show examples of faster transition procedure which the present invention is applied.
Figure 10:
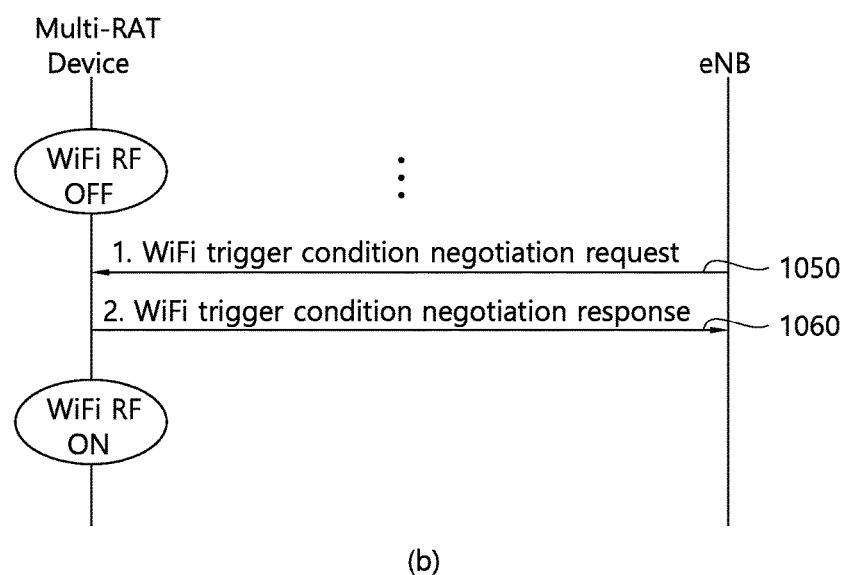

FIG. 10 illustrates a signaling flow of fast transition according to an embodiment of the present invention. Herein, a UE according to the present invention may support 3GPP LTE(-A) system as a primary RAT system while supporting Wi-Fi system as a secondary RAT system and contains a communication device that transmits/receives with selection or all U-plane data using the secondary RAT system. Hereinafter, the present invention shows a scheme of transmitting and receiving newly defined parameters with a network using a new message, such as WiFi trigger condition negotiation request and response, for example, this invention shows a procedure of the parameters which may be initiated by the UE or network.

Firstly, FIG. 10(a) shows a process of requesting configuring a parameter by a UE initiated. The example of initiating delivery of parameters by the UE may include a process of establishment/reestablishment connection with a cellular entity, an idle state transition when WiFi RF is turned on by the user of the UE.

As shown in FIG. 10(a), in case WiFi RF is operated as ON state by the user, the UE sends a WiFi trigger condition negotiation request to the network so that the UE requests transmission of UE-specific parameters for faster transition (1010).

When receiving the WiFi trigger condition negotiation request by the network, the network sends to the UE a WiFi trigger condition negotiation response including information for fast scanning including AP list (e.g., AP 1, AP2, AP3) based on location, each AP's system information, beacon, frequency channel, system type and system version. Further, the response may also contain information including a list of AP(s) having the same SSID/HESSID as a service available AP of a serving AP-AP1 for the fast scanning. Further, the response may also contain a UE-specific threshold per-action. This may include the information shown in Table 2 to 4. Further, the UE-specific threshold may contain, e.g., Configuration type, Action #, Threshold value, Bearer information, QoS information, NW preference, Scanning information, Satisfaction duration, Sleep mode transition duration, Disassociation duration (1020). Also the information includes the UE-specific threshold, data-specific threshold, and amount of Data.

Thus, the UE may attempt to perform WiFi scanning using the parameters including the delivered UE-specific threshold, data-specific threshold, and the amount of Data at when the threshold is transferred. So it includes the fast transition of U-plane which is performed to the optimal (proper) AP obtained through the WiFi scanning.

FIG. 10(b) illustrates a process of a network initiated, e.g., an eNB, sending a request for configuring a parameter to a UE. The example of initiating delivery of parameters by the eNB may include when initially establishment/reestablishment connection with a cellular entity, when WiFi RF is determined to be necessarily turned on by the cellular network, and when switch to idle state is indicated to the UE.

In case it is determined that the transmitting/receiving unit in a second system needs to be activated by the network in a first system, for example, when it is determined that the WiFi RF in the UE needs to be turned on by an eNB, the eNB sends to the UE a WiFi trigger condition negotiation request including information for fast scanning including system version, system type, frequency channel, beacon, each AP's system information, and location based AP list (e.g., AP1, AP2, Ap3) (1050). The request contains UE-specific parameters for the fast scanning and may also contain a per-service action UE-specific threshold and a list of AP(s) having the same SSID/HESSID as service available AP of the serving AP (AP1) by the UE. This may be transmitted in the form shown in Tables 2 to 4. Also the information includes the UE-specific threshold, data-specific threshold, and amount of Data. Further, the UE-specific threshold may contain, e.g., Configuration type, Action #, Threshold value, Bearer information, QoS information, NW preference, Scanning information, Satisfaction duration, Sleep mode transition duration, Disassociation duration.

For acknowledging reception of the request, the UE sends a WiFi trigger condition negotiation response (1060). In case the UE operates its WiFi RF on, the UE may attempt WiFi scanning using the delivered parameters including the information. So it includes the fast transition of U-plane which is performed to the optimal (proper) AP obtained through the WiFi scanning.

Here, in case the fast transition is requested through WiFi trigger condition negotiation by the network, this may be used as requesting the UE-specific threshold negotiation or may mean indicating WiFi scanning to the UE, as well as negotiating for the UE-specific threshold. An indicator for indicating WiFi scanning may be set as on/off or as a predetermined bit or Boolean value or reception of the request message may be deemed an implicit indication. In this embodiment shows the UE-specific threshold as example for a procedure, the procedure includes a delivery on the data-specific threshold, and amount of Data further.

Therefore, after (at the time) the negotiation for the UE-specific threshold is completed successfully, the UE performs the WiFi scanning. Also, this embodiment can operate that this WiFi scanning operation includes that the UE makes rejection of the WiFi scanning when it needs by the configuration of the user.

Further, in the WiFi trigger condition negotiation request/response procedures, in case the threshold is varied (modified), the modified UE-specific threshold may be transferred/re-transferred by considering load of data status (as an example, AP load) of the first system (cellular system) and the second system (WiFi system).

Figure 11:
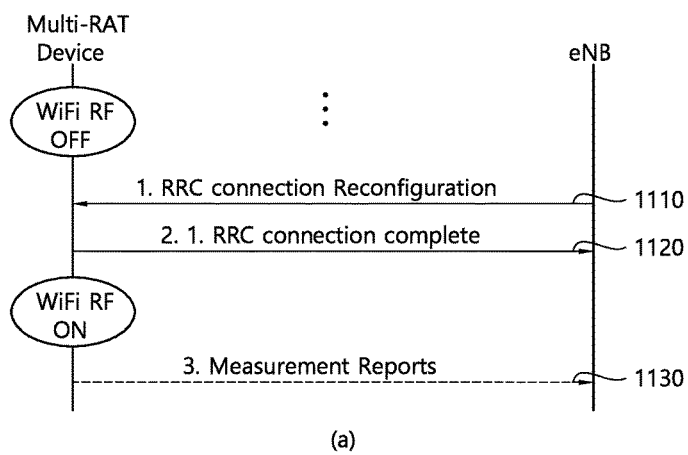
Figure 11:
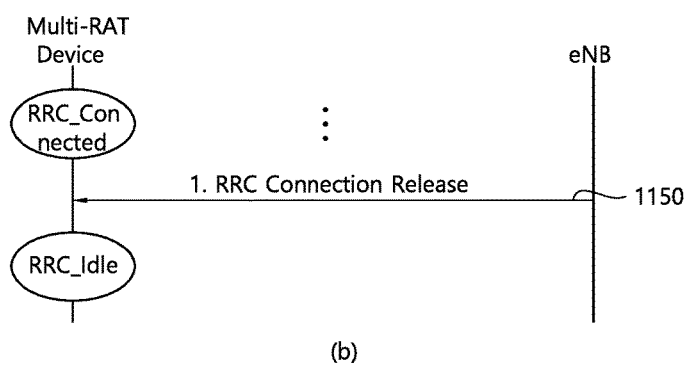
Figure 11:
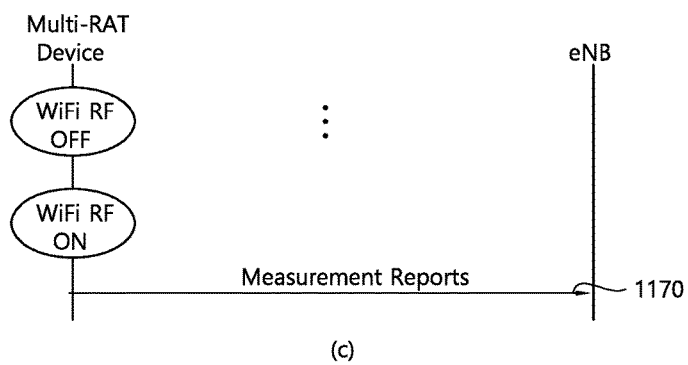

FIG. 11 illustrates signaling parameters for fast transition according to another embodiment of the present invention. FIG. 11 shows an example where UE-specific thresholds are communicated using a RRC messages.

As shown in FIG. 11(a), the UE may receive a UE-specific threshold from the network using an RRC connection reconfiguration procedure (1110). According to the present invention, the RRC connection reconfiguration including the UE-specific threshold may be configured for the purposes of setting up/modifying/releasing WLAN triggering conditions.

Further, the UE-specific threshold may be transmitted/received through an RRC message relating to measurements. As an example, WLAN measurement configuration (e.g., MeasObjectWLAN-carrierinfo/channel number, cellsToAddModList/cell index/AP's MAC address, Reporting configuration etc.) may be configured and delivered (transmitted). By doing so, the UE configures a WLAN measurement configuration and reflects a UE-specific threshold to each configured measurement configuration to thereby set up/modify/release measurements for a corresponding AP. Or, the UE-specific threshold may be transmitted through an RRC message related to bearer configuration. As an example, the UE-specific threshold to establish/modify/release radio bearers may be delivered alongside bearer information (e.g., radioResourceConfigDedicated).

The UE sends an RRC connection reconfiguration complete to the network (1120). It may be informed through a message of the complete that the UE-specific threshold and measurements or bearer establishment are successfully received.

The UE, when its' WiFi RF operating on, may attempt WiFi scanning using the delivered parameters including the UE-specific threshold. The UE transmits a measurement report for results of WiFi scanning (1130).

Here, transmission/reception of the UE-specific threshold may include WiFi scanning indication/response as well as negotiation of the UE-specific threshold. In this embodiment shows the UE-specific threshold as example for a procedure, the procedure includes a delivery on the data-specific threshold, and amount of Data further. An indicator for indicating the WiFi scanning may be defined as on/off, a predetermined bit, or Boolean value. Implicit WiFi scanning may be indicated through the RRC message.

As shown in FIG. 11(b), the network may instruct the UE receiving the UE-specific threshold to select LTE, the first system, or WLAN, the second system, when data transmission is requested, through a RRC Connection Release procedure (1150). In other words, the network instructs the UE to release the RRC connection establishment with the cellular system (the first system) by sending the RRC Connection Release and to then operate in idle mode, and, the network may instruct the WiFi RF (the second system) to operate on to perform data transmission/reception using the configured parameter including the UE-specific thresholds.

Furthermore, the network may make that the UE is awake or updated using a paging or TAU (Tracking Update) message, or informing an offset from the UE-specific threshold relative to the existing value in broadcast manner. In other words, the UE-specific threshold is updated through the offset.

As shown in FIG. 11(c), according to the present invention, the UE performs WiFi scanning, e.g., when WiFi RF is turned on by the user of the UE, and the UE may then deliver a UE-specific threshold for faster transition to the network together with measurement results (1190). Although the measurement configuration is not configured by the eNB, the UE may send the result of the scanning of WiFi, e.g., scanning target identity, measurement result, through a measurement report. At this time, a per-RAT type measurement ID (measId) for an autonomous measurement report may be predefined. In case of WLAN, measId may be set as measId=32. Or, it may be delivered together with information indicating which the measurement object is for, such as inter-RAT type.

Figure 12:
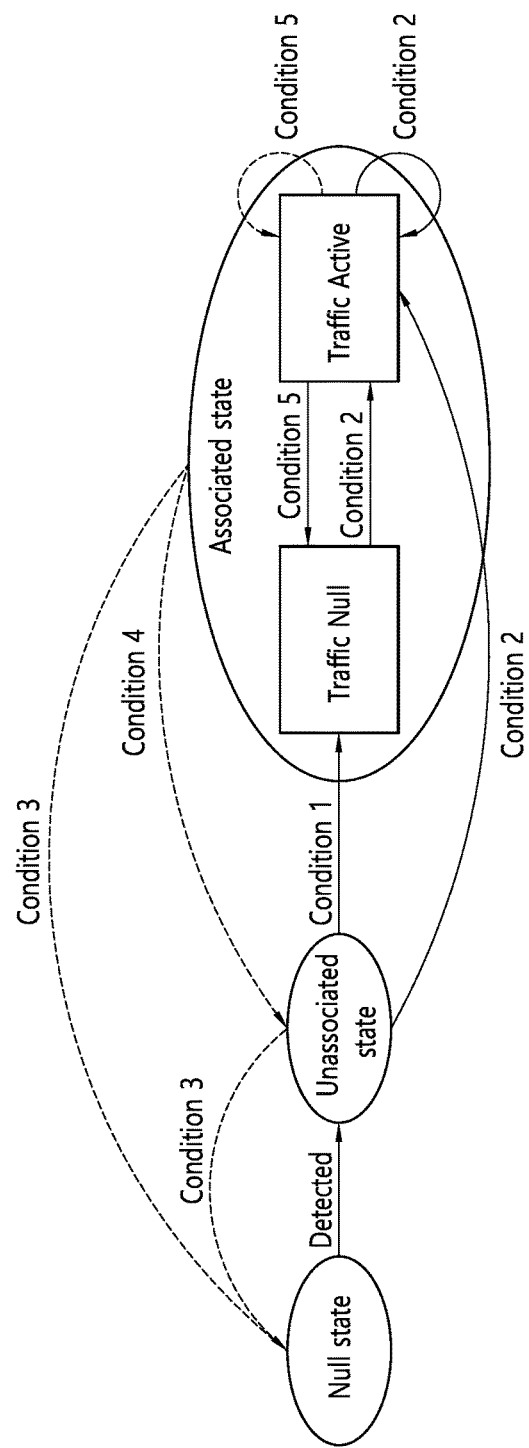
FIG. 12 shows an example of UE's status which the present invention is applied.

FIG. 12 schematically illustrates a UE's status shifts according to the present invention. This embodiment shows to illustrate the UE's status operation according to UE-specific thresholds for faster transition. A UE that has taken action corresponding to Condition # as the condition is satisfied is shown in the FIG. 12, the description of the Action is shown in the above Table 2.

Referring to FIG. 12, condition configuration 2 of the UE is shown, as an example is applied for Wi-Fi, the example can be applied to LTE with modification and variation. Further, each condition should be satisfied a predefined period, e.g., Satisfaction duration.

TABLE 5

| Number | References |
| --- | --- |
| Condition #1 | Threshold value for Action #2 ≤ WiFi measurement output |
| Condition #2 | Threshold value for Action #3 ≤ WiFi measurement output |
| Condition #3 | Threshold value for Action #4 ≥ WiFi measurement output |
| Condition #4 | Threshold value for Action #5 ≥ WiFi measurement output |
| Condition #5 | Threshold value for Action #6 ≥ WiFi measurement output |

Referring to Table 5 above, operations by the UE according to UE-specific threshold negotiation are firstly described.

Condition #1 : Threshold value for Action #2≤WiFi measurement output. The UE performs to process (re)association with the best AP that is selected per pre-association priority among one or more APs satisfying Condition #1. Herein, if U-plane transition is not performed until WiFi sleep mode transition duration is expired, the UE switches to WiFi sleep mode, this may be applied when WiFi sleep mode transition duration is negotiated. Further, in case U-plane transition is not achieved until WiFi disassociation duration is expired, the UE performs disassociation, this may be applied in case WiFi disassociation duration is negotiated.

Condition #2 : Threshold value for Action #3 ≤WiFi measurement output. The UE performs U-plane transition with a WiFi system over one or more bearers corresponding to Condition #2. At this time, in case association is not accomplished, the UE performs (re)association firstly with the best AP selected among one or more APs satisfying Condition #2.

Condition #3 : Threshold value for Action #4 ≥WiFi measurement output. In case all APs meet Condition #3, the UE may stop WiFi scanning. Or, it includes that WiFi RF of the UE may be turned off. At this time, when in association, the UE may firstly perform disassociation on the corresponding AP.

Condition #4 : Threshold value for Action #5≥WiFi measurement output. When satisfying the above condition together with an associated AP, the UE carries out disassociation on the corresponding AP.

Condition #5 : Threshold value for Action #6≥WiFi measurement output. The UE performs U-plane transition with cellular on one or more bearers corresponding to Condition 5.

Here, a measurement report of the UE may not be mandatory. That is the measurement report can be set with selectively, or when the measurement report is indicated as a need.

Meanwhile, operations by cellular network indications according to UE-specific threshold negotiation are now described. The UE can report information on a condition satisfied (e.g., Condition #) to the cellular network. The cellular network transmits an action code responsive to the report. While the condition remains met after the transmission has been made, the cellular network may send an action code to a device as the UE whenever it needs to be determined, and that is, it may include unsolicited transmission. Further, when receiving action code '0b001 ' for the corresponding condition, the UE may receive action code '0b01' whenever it needs. As an example of the action code, '0b00' means that a report of event is requested when an event (condition) is happened, and '0b01' means that a corresponding operation can be performed immediately when the condition is met.

The UE which is received action code '0b00', reports further condition to the cellular network when an event which was the already reported condition is modified. This may include, e.g., when the condition reported to be met is not valid any longer. After receiving action code '0b01', the UE operates depending on the received UE-specific threshold.

An operation indicated by the cellular network according to the UE's measurement report is now described further.

The UE performs measurements and measurement report. The UE receives and sets up a measurement configuration and condition configuration for WiFi that are configured by the cellular network, and performs measurements and measurement report according to the configurations.

The cellular network compares thresholds configured according to the condition configurations and the measurement configuration with the measurement results reported by the UE. More specifically, the comparisons are described below.

Condition #1 : Threshold value for Action #2≤WiFi measurement output. The network may inform the UE of an AP of one or more APs satisfying condition #1, through which (re)association should be done. At this time, the cellular network may also send the WiFi sleep mode transition duration. Further, the cellular network may also send the WiFi disassociation duration. The information delivered from the network may contain AP information to be (re)associated and an action code including (re)association. The AP information may include e.g., band, channel number, BSSID, SSID, HESSID, and further include WiFi sleep mode transition duration and WiFi disassociation duration.

Condition #2 : Threshold value for Action #3≤WiFi measurement output. The network may indicate U-plane transition with the WiFi system on one or more bearers corresponding to condition #2. At this time, when association is not completed yet, the information delivered under Condition #1 may be transmitted together. The information delivered from the network may include an action code indicating U-plane transition (between Cellular and WiFi), identification information on bearer such as LCID/DRB ID/E-RAB ID/EPS Bearer ID, Routing type (U-plane aggregation/segregation/switch), Routing rule (transmission ratio through each RAT system, or transmission RAT=WiFi), and AP information (e.g., band, channel number, BSSID, SSID, HESSID). Herein, the action code further includes information on direction of the U-plane transition.

Condition #3 : Threshold value for Action #4≥WiFi measurement output. In case the results measured for scanned AP meets condition #3 above, the network may instruct the UE to stop the WiFi scanning. Then, the WiFi RF of the UE may be operated to off state. This may also be indicated through a RRC Connection Reconfiguration to release measurements.

Condition #4 : Threshold value for Action #5≥WiFi measurement output. In case the measurement results between the UE and the AP associated with the UE meets condition #4, the network may instruct the UE to perform disassociation on the AP. The information related to Condition #4 may include an action code indicating disassociation and AP information to be disassociated (e.g., band, channel number, BSSID, SSID, HESSID).

Condition #5 : Threshold value for Action #6≥WiFi measurement output. The network may instruct the UE to perform U-plane transition with cellular on one or more bearers corresponding to Condition #5. At this time, information may include an action code indicating (WiFi) U-plane transition, bearer identification information such as LCID/DRB ID/E-RAB ID/EPS Bearer ID, and Routing type (U-plane aggregation/segregation/switch), Routing rule (transmission ratio through each RAT system, or transmission RAT=cellular).

Accordingly, in response to the network's instruction, the UE performs an operation based on the received action code.

In case the action code is identified (re)association by the UE, the UE performs (re)association to the indicated AP. At this time, in case U-plane transition is not performed until the WiFi sleep mode transition duration is expired, the UE switches to WiFi sleep mode. This may be applied when the WiFi sleep mode transition duration is received. Meanwhile, in case U-plane transition is not achieved until the WiFi disassociation duration is expired, the UE may perform disassociation. This may be applied when the WiFi disassociation duration is received.

In case the action code is verified cellular U-plane transition by the UE, the UE performs U-plane transition with the WiFi system on one or more bearers indicated. At this time, in case it is under no association, (re)association to the indicated AP is firstly performed.

Meanwhile, when receiving an RRC connection reconfiguration to release measurements by the UE, the UE may stop WiFi scanning. The UE then operates its WiFi RF off. When the UE is in association, the UE performs disassociation on the AP.

In case the action code is verified disassociation, the UE performs disassociation on the indicated AP, i.e., associated AP.

In case the action code is verified WiFi U-plane transition, the UE performs U-plane transition with the cellular system on one or more bearers indicated.

According to the present invention, in case UE-specific thresholds are defined on a per-bearer basis, the UE may maintain the associated state with one or more APs. Accordingly, seamless HO may be supported in this invention.

As shown, an action may be performed by a UE, network or both entities including the UE and network, e.g., when a corresponding triggering condition is satisfied by the UE or by the UE in response to the network's instruction (command, or indication). Accordingly, the UE may trigger a corresponding action using the per-action threshold, or selectively report about the triggering action to the network, or may conduct a corresponding action as per the network's instruction. Or, measurement report by the UE may be selectively performed as optionally. Table 6 below summarizes schemes of performing actions according to the present invention. However, the present embodiment is not limited to the Table 6, and the operations shown in the Table 6 may be selectively varied/deleted depending on the need of the UE and network.

TABLE 6

|  | Option 1 | Option 2 | Option 3 |
|---|---|---|---|
| Entity to determine to perform | UE | Network | Network |
| Conditions to perform | When triggering condition is met | Instruction from network | Instruction from network |
| Entity having triggering condition | UE, Network | UE, Network | Network |
| Reporting whether triggering condition is met | — | YES | — |

TABLE 6-continued

| | Option 1 | Option 2 | Option 3 |
|---|---|---|---|
| Reporting Wifi signal strength | — | — | YES |

Figure 13:
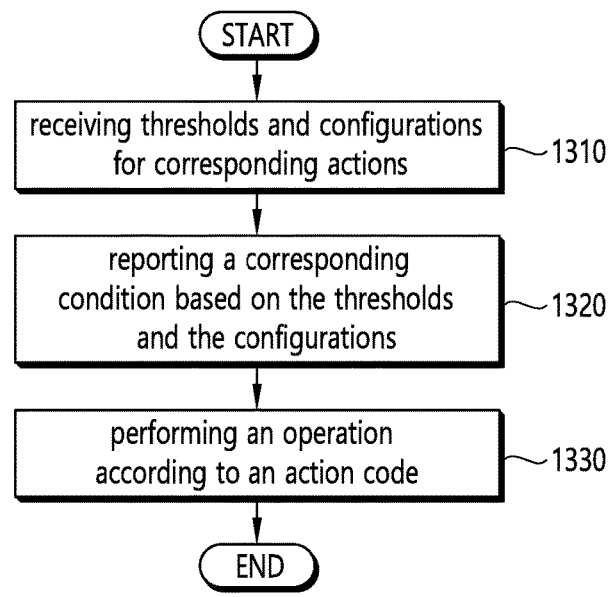
FIG. 13 shows a flow chart for performing a corresponding operation according to an action and condition which the present invention is applied.

FIG. 13 illustrates a flowchart of performing associated actions according to the present invention.

Referring to FIG. 13, the UE receives configuration information including UE-specific threshold(s) and information for fast scanning from the network (1310). The configuration information may include information for configuring to perform efficient data communication with the second system by the UE which is located in the first system, the information for configuring may be configured with a triggering condition, a measurement configuration, or a radio bearer configuration. The UE-specific threshold(s) may be extended to thresholds which are defined as data amount, data characteristic (type), or data QoS. Further, the threshold(s) parameters includes per UE-specific threshold(s), data amount, data characteristic (type), data QoS, or a network preference type among two more systems.

As an example, the configuration information may be transmitted, including the UE-specific threshold(s) per-action according measurement results for WiFi. The threshold(s) may be defined as user preference and/or NW preference (including cellular, WiFi), cellular link condition, measurement result, bearer and QoS basis. Also the configuration information includes data-specific threshold, and amount of Data. According to the present invention, the parameters of the information of threshold(s) may be transmitted through a WiFi trigger condition negotiation request/response or a RRC message, or such transmission may also be conducted by a measurement report.

The UE may identify (determine or check) whether an event satisfying the triggering condition is occurred (happened) using the configuration information, the configured parameters including the threshold(s). The UE may report a corresponding condition number (condition #) to be satisfied the triggering condition to the network, that is, the UE can check and report a condition based on the thresholds and the configurations (1320). At this time, the UE may report to the network the measurement result together with the condition or may also report only the condition through the measurement report. Depending on the UE's report, the network may compare the reported condition with the condition that it has configured on its own. According to the comparison, the network may instruct the UE to perform a corresponding action. In such case, the information delivered by the network may contain an action code and information necessary to perform the operation. Accordingly, the UE may carry out the operation according to the action (1330).

Figure 14:
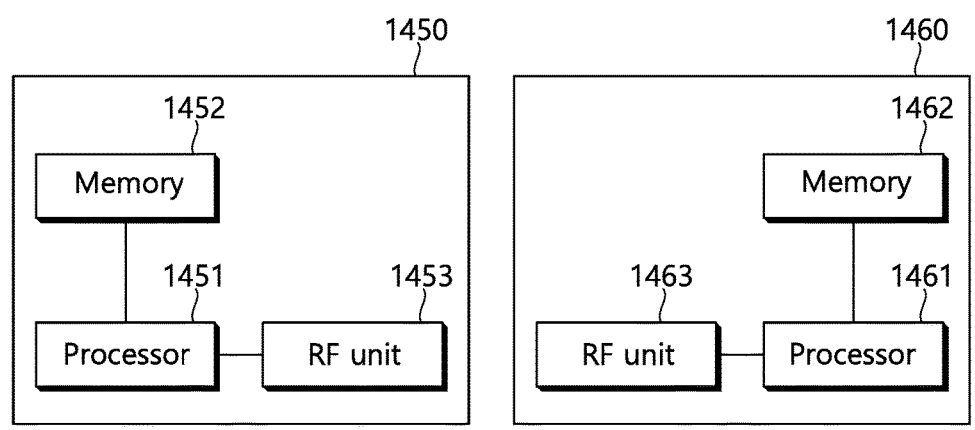
FIG. 14 shows a block diagram showing a wireless communication system according to an exemplary embodiment of the present invention.

FIG. 14 is a block diagram showing a wireless communication system according to an embodiment of the present invention.

A BS 1450 includes a processor 1451, a memory 1452, and a radio frequency (RF) unit 1453. The memory 1452 is coupled to the processor 1451, and stores a variety of information for driving the processor 1451. The RF unit 1453 is coupled to the processor 1451, and transmits and/or receives a radio signal. The processor 1451 implements the proposed functions, procedures, and/or methods. In the embodiments of FIG. 2 to FIG. 13, the operation of the BS can be implemented by the processor 1451.

Especially, the processor 1451 may configure one or more cells with different frequencies or systems including Cellular/Wi-Fi, for this invention the processor 1451 may configures U-plane configuration having a WLAN triggering condition, a measurement configuration, and/or radio bearer configuration with the Wi-Fi system as the secondary system.

The processor 1451 may configure information including thresholds on actions each which is configured for the Wi-Fi system as the secondary system, to extend data transmission in this embodiments, the thresholds on actions each is used for triggering a condition by a threshold and a measurement result of an AP under the secondary RAT system so that it leads to UE perform a corresponding action according to the condition. The threshold is changeable and varied by at least one of a network preference including a primary RAT system or the secondary RAT system, a quality of service (QoS) information, and bearer information. Also the threshold can be defined based on data amount, data characteristic (type), or data QoS.

The processor 1451 may configure the information, the information further includes information on the action including whether an association with the secondary RAT system is set or not, a scanning for the secondary RAT system is suspended or not, and a transition direction between the primary RAT system and the secondary RAT system for the data transmission is set, the information on the action includes as a number for a corresponding action. Also the information further include information on the condition including a threshold of triggering, a duration including at least one of satisfaction duration for a condition, sleep mode transition duration, and a disassociation duration, the information on the condition includes as a number for a corresponding condition. And the information further includes a scanning information including a priority of access points(APs) of the secondary RAT system, and preference information including an available AP, a preferred AP, or a private AP, wherein the priority is determined by a load and a service set of the APs each. The processor 1451 may configure the information, the information further includes a configuration including whether a condition is setup, modified or released.

Thus the processor 1451 may have a signal procedure having the configured information with UE, the processor 1451 control to transmit and receive a trigger condition negotiation request message, a trigger condition negotiation response message, or a radio resource control (RRC) message including a trigger condition configuration, a measurement configuration, a radio resource bearer configuration, a connection release of the primary RAT system, or a measurement report message with UE.

The wireless device 1460 includes a processor 1461, a memory 1462, and an RF unit 1463. The memory 1462 is coupled to the processor 1461, and stores a variety of information for driving the processor 1461. The RF unit 1463 is coupled to the processor 1461, and transmits and/or receives a radio signal. The processor 1461 implements the proposed functions, procedures, and/or methods. In the embodiments of the FIG. 2 to FIG. 13, the operation of the UE can be implemented by the processor 1461.

Especially, the processor 1461 may configure one or more cells with different frequencies or systems including Cellular/Wi-Fi, for this invention the processor 1451 may configures U-plane configuration having a WLAN triggering condition, a measurement configuration, and/or radio bearer configuration with the Wi-Fi system as the secondary system.

The processor 1461 may check an configure information including thresholds on actions each which is configured for the Wi-Fi system as the secondary system, to extend data transmission in this embodiments, the thresholds on actions each is used for triggering a condition by a threshold and a measurement result of an AP under the secondary RAT system so that it leads to UE perform a corresponding action according to the condition. The threshold is changeable and varied by at least one of a network preference including a primary RAT system or the secondary RAT system, a quality of service (QoS) information, and bearer information. Also the threshold can be defined based on data amount, data characteristic (type), or data QoS. Herein the processor 1461 may check the information by having one of operation as acquiring, comparing, measuring, determining, and calculating, etc.

The processor 1461 may determine (or check) the information, the information further includes information on the action including whether an association with the secondary RAT system is set or not, a scanning for the secondary RAT system is suspended or not, and a transition direction between the primary RAT system and the secondary RAT system for the data transmission is set, the information on the action includes as a number for a corresponding action. Also the information further includes information on the condition including a threshold of triggering, a duration including at least one of satisfaction duration for a condition, sleep mode transition duration, and a disassociation duration, the information on the condition includes as a number for a corresponding condition. And information further includes a scanning information including a priority of access points(APs) of the secondary RAT system, and preference information including an available AP, a preferred AP, or a private AP, wherein the priority is determined by a load and a service set of the APs each. The processor 1461 may check and configure the information, the information further includes a configuration including whether a condition is setup, modified or released.

Thus the processor 1461 may have a signal procedure having the configured the information with UE, the processor 1461 control to transmit and receive a trigger condition negotiation request message, a trigger condition negotiation response message, or a radio resource control (RRC) message including a trigger condition configuration, a measurement configuration, a radio resource bearer configuration, a connection release of the primary RAT system, or a measurement report message with UE.

Also the processor 1461 may perform scanning operation about the secondary RAT system, after acquiring the information with the threshold for the UE, wherein the information with the threshold includes an indication to indicate the scanning operation. Further the processor 1461 may control to report the measurement result on associated access points (APs) of the secondary RAT system. That is, the processor 1461 may control to report the information on the condition which is satisfied with the threshold and the measurement result, to an entity of a primary RAT system, and receive an action code including whether one code is indicated to perform the action directly or other code is indicated to report a condition when the condition is changed from the entity of the primary RAT system, which is one of an eNodeB (eNB), a mobility management entity (MME), or a new entity.

The processor may include application-specific integrated circuit (ASIC), other chipset, logic circuit and/or data processing device. The memory may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by processor. The memory can be implemented within the processor or external to the processor in which case those can be communicatively coupled to the processor via various means as is known in the art.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for performing data transmission in a wireless communication system, by a user equipment (UE), the method comprising:
   performing data transmission through a primary radio access technology (RAT) system;
   acquiring a radio resource control (RRC) connection reconfiguration message including first information on a threshold and second information on a satisfaction duration;
   comparing the threshold identified by the first information and a measurement result of a secondary RAT system during the satisfaction duration identified by the second information; and
   when the measurement result of the secondary RAT system is greater than the threshold, performing data transmission through the secondary RAT system,
   wherein the primary RAT system is a 3rd generation partnership project (3GPP) long-term evolution (LTE) system, wherein the secondary RAT system is an institute of electrical and electronics engineers (IEEE) 802.11 system, and
   wherein the satisfaction duration is a duration during which a condition, that the measurement result of the secondary RAT system is greater than the threshold, should be met.

2. The method of claim 1, wherein performing data transmission through the secondary RAT system comprises:
   performing a user-plane (U-plane) transition from the primary RAT system to the secondary RAT system.

3. A user equipment (UE) for transmitting data in a wireless communication system, the UE comprising:
   a memory;
   a transmitter and receiver; and
   a processor, operatively coupled to the memory and the transmitter and receiver, wherein the processor is configured to:
   control the transmitter to transmit data through a primary radio access technology (RAT) system;
   control the receiver to receive a radio resource control (RRC) connection reconfiguration message including first information on a threshold and second information on a satisfaction duration;

compare the threshold identified by the first information and a measurement result of a secondary RAT system during the satisfaction duration identified by the second information; and control the transmitter to transmit data through the secondary RAT system when the measurement result of the secondary RAT system is greater than the threshold, wherein the primary RAT system is a 3rd generation partnership project (3GPP) long-term evolution (LTE) system, wherein the secondary RAT system is an institute of electrical and electronics engineers (IEEE) 802.11 system, and wherein the satisfaction duration is a duration during which a condition, that the measurement result of the secondary RAT system is greater than the threshold, should be met.

* * * * *